United States Patent Office 3,447,276
Patented June 3, 1969

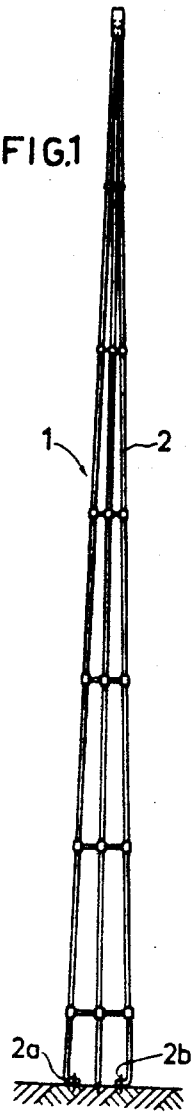
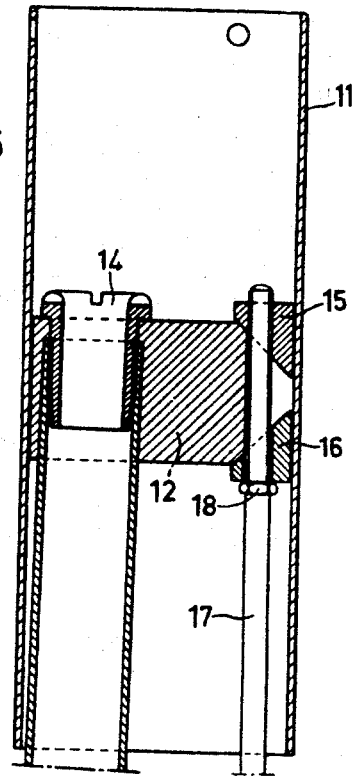
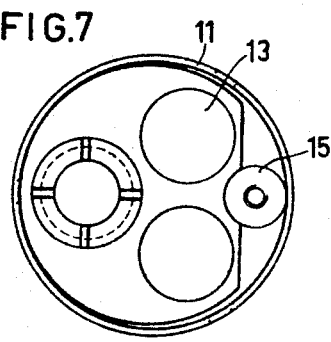

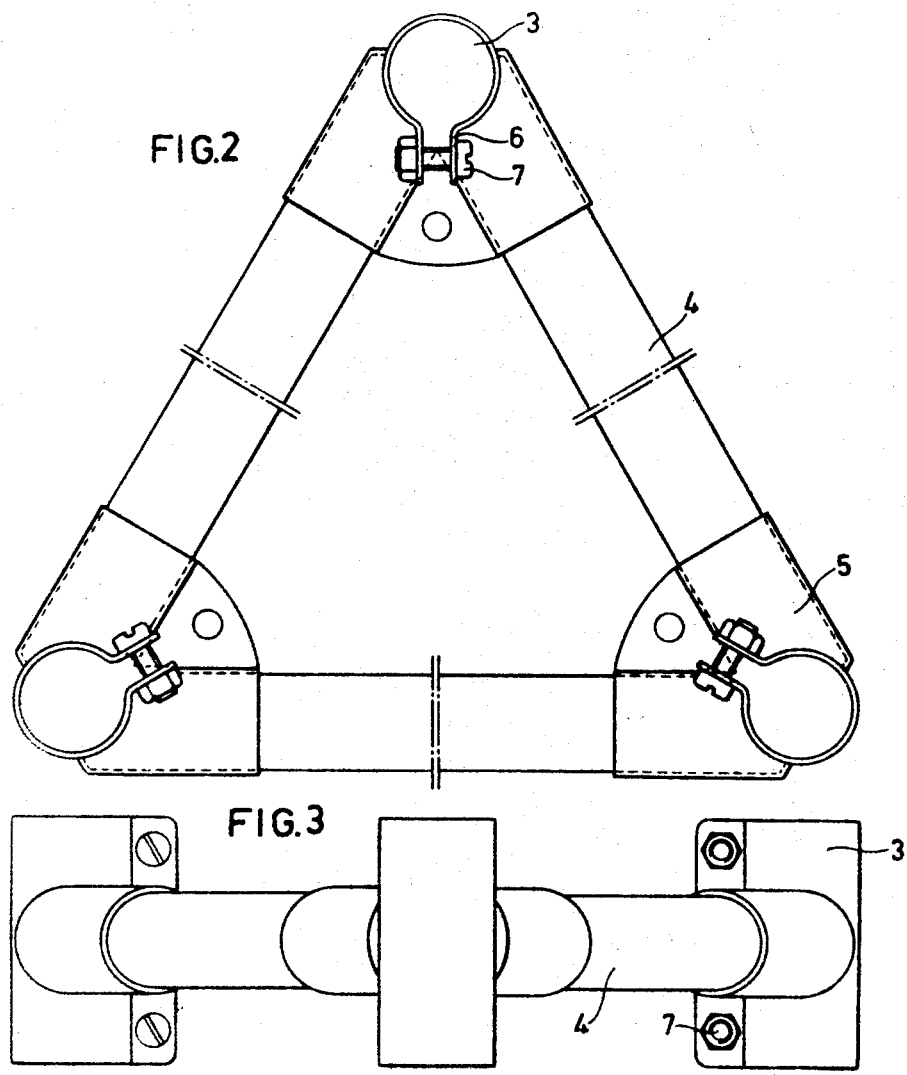

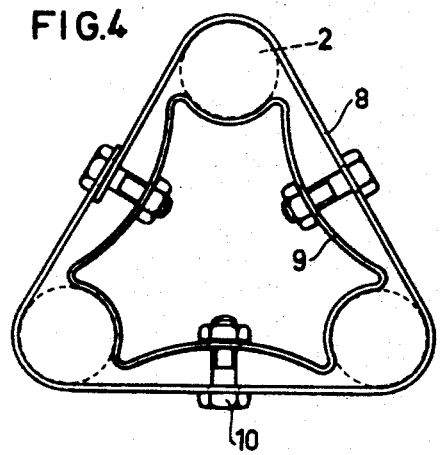
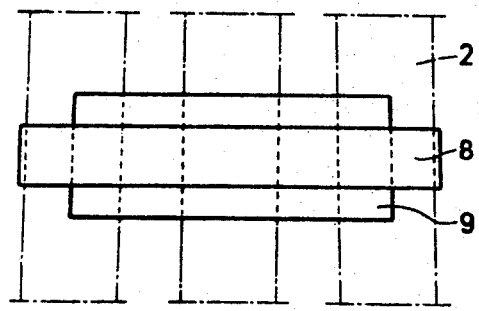

3,447,276
MAST STRUCTURES
Erik Patrik Viktor Svensson and Uno Nyberg, Stockholm, Sweden, assignors to KGL Luftfartsstyrelsen, Stockholm, Sweden, a Swedish civil service department
Filed Aug. 4, 1965, Ser. No. 477,090
Claims priority, application Great Britain, Aug. 17, 1964, 33,613/64
Int. Cl. E04h 12/08
U.S. Cl. 52—648                 3 Claims

ABSTRACT OF THE DISCLOSURE

There is disclosed herein a mast structure for use particularly on an airfield or the like in the support of approach lights, antennae, meteorological instruments, etc. This mast structure comprises legs made up of light-weight tubing, the legs being rigidly interconnected by spaced bracing members which join the legs and hold them in position through the use of friction connections whereby the mast is a rigid structure in normal use but can readily collapse or at least partially collapse if it is hit by an aircraft, for example.

---

The present invention relates to mast structures for supporting approach lights, antennae, meteorological equipment, or the like, particularly but not exclusively for aeronautical purposes.

The masts hitherto used for the purposes set out above are as a rule of a rigid and robust design, and will be, for that reason, potentially dangerous for landing or taking-off aircraft, as a collision with such a mast might cause an airplane crash.

It is a principal object of the present invention to provide a mast structure for the purposes stated above, which, although being perfectly capable of withstanding and stresses which may be expected in normal use, is adapted to collapse when hit by an aircraft without causing any appreciable damage to the latter, and also rendering the collapsed mast structure easily repaired.

According to the invention a lattice-work mast structure is provided, having polygonal cross section and comprising legs each made up of light-weight tubing, said legs being rigidly interconnected by spaced brace members adapted to join said legs together by frictional clamping to form an assembly that acts as a rigid structure in normal use, but will readily collapse, at least partly, when hit e.g. by an aircraft.

According to a preferred form of the invention a tripod mast structure is provided having a triangular cross section, its tripod legs being made up of light-metal or light-alloy tubing, and being rigidily inter-connected by spaced triangular braces adapted to join said legs together by frictional clamping to form an assembly which acts as a rigid structure in normal use, but will readily collapse, at least partly, when hit by an aircraft.

The invention is illustrated in the acompanying drawings in which:

FIG. 1 is a diagrammatic side-elevational view of a mast structure in accordance with this invention, FIG. 2 is a top-plan view of a triangular brace, FIG. 3 is a front elevational view of the brace of FIG. 2, FIGS. 4 and 5 are respectively top-plan and front-elevational views of another form of triangular brace, FIG. 6 is a longitudinal cross-sectional view of a top member for the mast, and FIG. 7 is a top-plan view of the top member of FIG. 6.

With reference to FIG. 1, the mast structure 1 illustrated therein may be of any desired height within the limits imposed by the need for sufficient stability and other practical considerations. It is secured at its base e.g. by its legs 2 being hingedly connected at the bottom extremities by being bent at about right angles to form studs 2a engaging upstanding lugs 2b securely attached to the ground (rock, or concrete foundation, for example).

The mast 1 is built as a tripod having its legs 2 made of light-weight tubing, such as light-metal tubes of circular cross section. At spaced intervals, the legs 2 are interconnected by braces comprising clamping sleeve members 3 (FIGS. 2 and 3) that form the corners of triangular structures in which the triangle sides are made up of lengths 4 of light-weight tubing, secured at the ends in sockets 5 formed integral with or rigidly secured to the sleeve members 3, which are preferably made of stainless steel. The sleeve members 3 are open along a longitudinal portion, and formed at either side of the latter with clamping lugs 6, which may be urged towards each other by means of clamping bolts 7 with nuts to clamp the sleeve member 3 tightly around the legs 2. The tubes 4 will form transversals of the mast structure, and interconnect the tripod legs 2 at spaced levels.

Since the mast tapers upwardly, the length of the tubes 4 will vary from one brace to the next, but, if the tripod legs form the corners of equilateral triangles, as will commonly be the case, all three tubes 4 of the same brace will be of the same length.

Near the top of the mast structure, the space between the tripod legs 2 will become too small to accommodate a brace such as illustrated in FIGS. 2 and 3. Instead, a brace as illustrated in FIGS. 4 and 5 may be used. This brace is made up of an outer sheet metal strip 8, shaped to form an equilateral triangle with rounded corners, and having overlapping end portions, and an inner sheet metal fitting 9 of a generally triangular shape, and having its corners formed with arcuate recesses to receive the tripod legs 2 between the recesses and the corners of the strip 8. The sides of the fitting 9 are curved inwardly, and clamping bolts 10 with nuts are inserted in aligned holes in the parts 8 and 9, one of those bolts joining, as well, the overlapping strip ends together. When tightened, the bolt means exert a frictional clamping force on each tripod leg 2.

For the purpose of mounting different kinds of equipment at the top of the mast, such as lights, antennae, meteorolgical apparatus, and the like, a hollow cylindrical top member 11 is provided (FIGS. 6 and 7). The member 11 is fitted around a cylindrical block 12 with some amount of radial clearance. The block 12 is formed with three bores 13 for the tripod legs 2. The upper extremity of each leg abuts a downward facing shoulder in the bore, as shown in FIG. 6, and a threaded plug 14 with a tapering end is screwed from above into the internally-threaded top end of each tripod leg 2, so that the legs are securely joined together by friction at the top of the mast.

The cylindrical block 12 has a portion cut away along a plane parallel to the cylinder axis, and oblique recesses are formed at the straight transverse edges of the block 12. Two spaced clamping elements 15, 16 are adapted to engage the block 12 and the adjacent inner surface portion of the cylindrical member 11, and to urge the latter against the diametrically opposite surface portion of the block member 12 when pulled towards each other, the clamping elements 15, 16 being formed with oblique surfaces engaging the oblique recesses in the cylindrical block 12. The upper clamping element 15 has a threaded axial bore, and the lower clamping element 16 has a clearance bore for a rod member 17, threaded at its upper end to engage the bore of element 15 and formed with an abutment collar, such as a nut 18, to engage the bottom face of the clamping element 16. This rod member 17 is formed, at its bottom end, with a squared portion (not illustrated), affording a grip for a spanner. Upon clockwise turning the rod member 17, the clamping elements 15, 16 are forced together to exert a radial pressure on the cylinder 11, so as to clamp the latter securely to the mast structure. Whenever desired, the member 11 may be as easily unclamped.

The apparatus to be supported by the top member 11 may be of any kind suitable for the purpose aimed at, and the specific manner of mounting it onto the top member will be obvious to those skilled in the art, and need not be described.

Whereas the invention has been described and illustrated as applied to a tripod mast structure, it can as well be embodied by a structure having a polygonal section with more legs than three. The braces will then have to be modified accordingly, and the manner to do so will be self-evident to one skilled in the art. Other modifications are also feasible within the scope of the invention, the embodiment disclosed being merely an example affording many variations.

As has been mentioned above, the tubes belonging to the mast structure are preferably light-metal or light-alloy tubes, whereas the clamping members should be made of a stronger material, preferably stainless steel. The clamping members have been shown in the drawings to be all disposed inside the outer circumference of the mast, to avoid any risk of a colliding aircraft having its sheet metal surface ripped open by any projecting parts.

The mast structure as above described will stand up to any normal and ordinary stresses to which it may be subjected in use. When hit by a sudden and concentrated force, such as caused by a colliding aircraft, the friction clamping joints will give in places, and the mast structure will collapse with the least possible damage. Such a collapsed mast structure will, as a rule, be easy to repair, as the damage will in most cases be restricted to a few simple parts readily exchanged.

With reference to FIG. 1, the erecting or lowering of the mast structure is facilitated by using the elbow-bent bottom ends 2a of two legs 2 as pivots, the extremity of the third leg being disengaged from its corresponding lug member 2b. The bends at the bottom of the legs used as pivots can also be used for the passage of electrical conductors protected by the legs and connected to the equipment at the top of the mast. By that arrangement, the conductors will not be disturbed and need not be disconnected when the mast is raised or lowered.

What we claim is:

1. A mast structure adapted for supporting aeronautical and meteorological apparatus, said structure comprising, in combination, at least three spaced vertically extending leg members of light-weight tubing, spaced horizontal brace members interconnecting said leg members, said brace members being generally polygon shaped with as many sides and corners as there are vertical legs, each brace member comprising a corner member for clamping to a leg member, said corner members having angularly extending socket portions, and side members, said side members comprising light-weight tubing, the ends of which enter into and releasably frictionally engage with the said tubular socket portions.

2. A mast structure adapted for supporting aeronautical and meteorological apparatus, said structure comprising, in combination, at least three spaced vertically extending leg members of light-weight tubing, spaced horizontal brace members interconnecting said leg members, said brace members being generally polygon shaped with as many sides and corners as there are vertical legs, each brace member comprising a corner member for clamping to a leg member, said corner members having angularly extending socket portions, and side members, said side members comprising light-weight tubing, the ends of which enter into and releasably frictionally engage with the said tubular socket portions, and an apparatus supporting member engaging the upper ends of said leg members, said supporting member comprising a generally cylindrical block mounted on the upper ends of said leg members, said block being cut off along a plane parallel to the axis of the block and passing through a chord of said cylinder, a hollow cylinder of slightly greater diameter than said block fitted about said block, beveled edges on said block at the top and bottom thereof adjacent said chordal plane, a pair of clamping members in the form of circle segments having beveled edges along the straight side thereof, each engaging one of said block beveled edges, a rod having a shoulder thereon engaging one of said clamping members, and a threaded portion engaging a threaded aperture in the other clamping member whereby when said rod is rotated said clamping elements move radially outward to clamp said cylinder to said block.

3. A mast structure as claimed in claim 2, wherein said block is provided with a plurality of shouldered openings extending therethrough, one of said leg members extending into each of said openings and lying with its ends adjacent the corresponding shoulder, said leg members being internally threaded, and a plug extending through the opposite end of said opening, said plug being threaded and threadedly engaging the corresponding internal thread of said leg member to thereby secure said block to said leg members.

References Cited

UNITED STATES PATENTS

| | | | |
|---|---|---|---|
| 1,093,326 | 4/1914 | Haskell | 52—648 |
| 1,521,422 | 12/1924 | Boyd | 52—649 |
| 1,658,535 | 2/1928 | Neilson | 52—225 |
| 2,118,396 | 5/1938 | Davis et al. | 52—648 |

FOREIGN PATENTS

| | | |
|---|---|---|
| 633,426 | 12/1949 | Great Britain. |
| 727,954 | 4/1955 | Great Britain. |
| 94,823 | 11/1923 | Austria. |

ROY D. FRAZIER, *Primary Examiner.*

R. D. KRAUS, *Assistant Examiner.*